Aug. 18, 1931.  G. KENDE  1,819,819

MECHANICALLY SYNCHRONIZED SHAFT

Filed May 3, 1929

GEORGE KENDE
*INVENTOR.*

BY

*ATTORNEY.*

Patented Aug. 18, 1931

1,819,819

UNITED STATES PATENT OFFICE

GEORGE KENDE, OF EAST ORANGE, NEW JERSEY, ASSIGNOR TO PHONODISC CORPORATION, OF NEW YORK, N. Y.

MECHANICALLY SYNCHRONIZED SHAFT

Application filed May 3, 1929. Serial No. 360,125.

The invention relates to improvements in synchronized sound and motion picture mechanism, and has for its object the introduction of a speed reduction gear mechanism adapted to be interposed between the operating motor and the sound reproducing and motion picture projecting machine so that both machines are operated simultaneously from the motor and at the then predetermined and set speed ratio, thus insuring the synchronized operation of the two mechanisms.

A further object of this invention is the provision of an exceedingly simple, compact and durable as well as inexpensive device adapted to be connected to the motor, preferably an electric motor with driving connection leading therefrom to the sound reproducing machine and the motion picture projector, for readily connecting the same in position, and for easily and quickly changing the gearing to effect various desired speed ratios.

In the accompanying drawings:—

Figure 1:
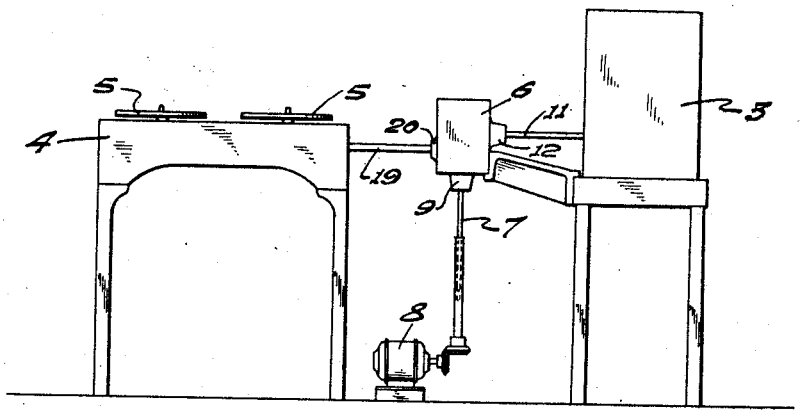
Figure 1 is a view in elevation showing the complete mechanism, the sound record machine and projector being in diagram.
Figure 2:
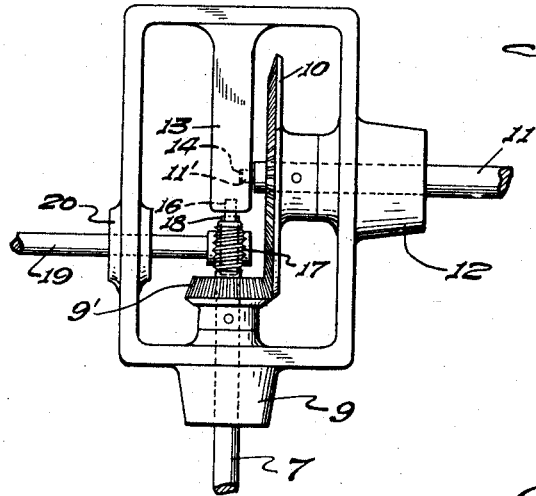
Figure 2 is a view on a larger scale of the gear mechanism.

Referring to the drawings, the numeral 3 designates the motion picture projector, 4 the sound reproducing machine. The latter is here shown as the double type with two turntables 5. The gear mechanism 6, is driven by the telescopic shaft 7 from an electric motor 8.

The upper end of the shaft 7 is journaled in the bearing 9, and carries the bevel gear 9' which as shown drives the large bevel gear 10, connected to the shaft 11 of the projector 3. This shaft is journaled in the bearing 12.

A bearing standard 13 is provided in the casing of the gearing, and is provided with a bearing 14 for the small end 11' of the shaft 11, while the reduced extension 16 of the shaft 17 is journalled in the end thereof. A worm 17 is provided upon the extension 16 and this meshes with the mating gear 18, carried by the shaft 19, journaled in the bearing 20 of the casing and operatively connected to drive the turntables 5 one at a time, through a desired selective mechanism.

It will thus be seen that a motor 8 of a fixed speed can through the gears 9'—10 and 17—18 operate the two shafts 11 and 20 simultaneously and at the proper speed ratio, regulated in accordance only by the gear ratios, and that this particular mechanism is adaptable for use with a disc record that is to be run at 33⅓ R. P. M. or 80 R. P. M., as may be desired, by merely changing the gears 17—18.

What I claim, is:

A gearing mechanism for synchronized machines, including a substantially rectangular open frame having shaft bearings, one each in three of its sides and a centrally disposed bearing standard projecting inwardly from the remaining side and aligned with the bearing in the opposed side, a drive shaft journaled in the latter bearing and having one end within the frame and journaled in the bearing standard, a worm gear and a bevel gear fast upon said end, two driven shafts also journaled in the remaining bearings of the frame, a large bevel gear carried by one driven shaft within the frame and meshing with the first bevel gear, and a mating worm gear carried by the remaining driven shaft and connected to the first worm gear.

In testimony whereof I affix my signature.

GEORGE KENDE.